(12) United States Patent
Myouga

(10) Patent No.: US 8,473,649 B2
(45) Date of Patent: Jun. 25, 2013

(54) COMMAND MANAGEMENT DEVICE CONFIGURED TO STORE AND MANAGE RECEIVED COMMANDS AND STORAGE APPARATUS WITH THE SAME

(75) Inventor: Nobuyuki Myouga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 13/077,559

(22) Filed: Mar. 31, 2011

(65) Prior Publication Data

US 2012/0023273 A1 Jan. 26, 2012

(30) Foreign Application Priority Data

Jul. 23, 2010 (JP) .................................. 2010-166292

(51) Int. Cl.
*G06F 3/00* (2006.01)
(52) U.S. Cl.
USPC .............................................. 710/52; 710/56
(58) Field of Classification Search
None
See application file for complete search history.

(56) References Cited

U.S. PATENT DOCUMENTS

| | | | | |
|---|---|---|---|---|
| 5,796,944 A * | 8/1998 | Hill et al. | ....................... | 709/250 |
| 7,987,315 B2 * | 7/2011 | Lee et al. | ....................... | 711/103 |
| 2007/0028040 A1 * | 2/2007 | Sinclair | ........................ | 711/113 |

FOREIGN PATENT DOCUMENTS

| | | | |
|---|---|---|---|
| JP | 02158857 A | 6/1990 |
| JP | 02292929 A | 12/1990 |
| JP | 2000090042 A | 3/2000 |

* cited by examiner

*Primary Examiner* — Idriss N Alrobaye
*Assistant Examiner* — David Martinez
(74) *Attorney, Agent, or Firm* — Patterson & Sheridan, LLP

(57) ABSTRACT

According to one embodiment, a command management device includes a command buffer, a free address register and a FIFO unit with entries. The command buffer stores commands received from a host. The entries include address sections configured to store addresses of the areas in the command buffer in which the respective commands are stored. The address sections are connected together like a ring. Each of the address sections includes a substitute module configured to substitute either the free address held in the free address register or a second address stored in the address section preceding the each of the address sections for a first address stored in the each of the address sections.

11 Claims, 10 Drawing Sheets

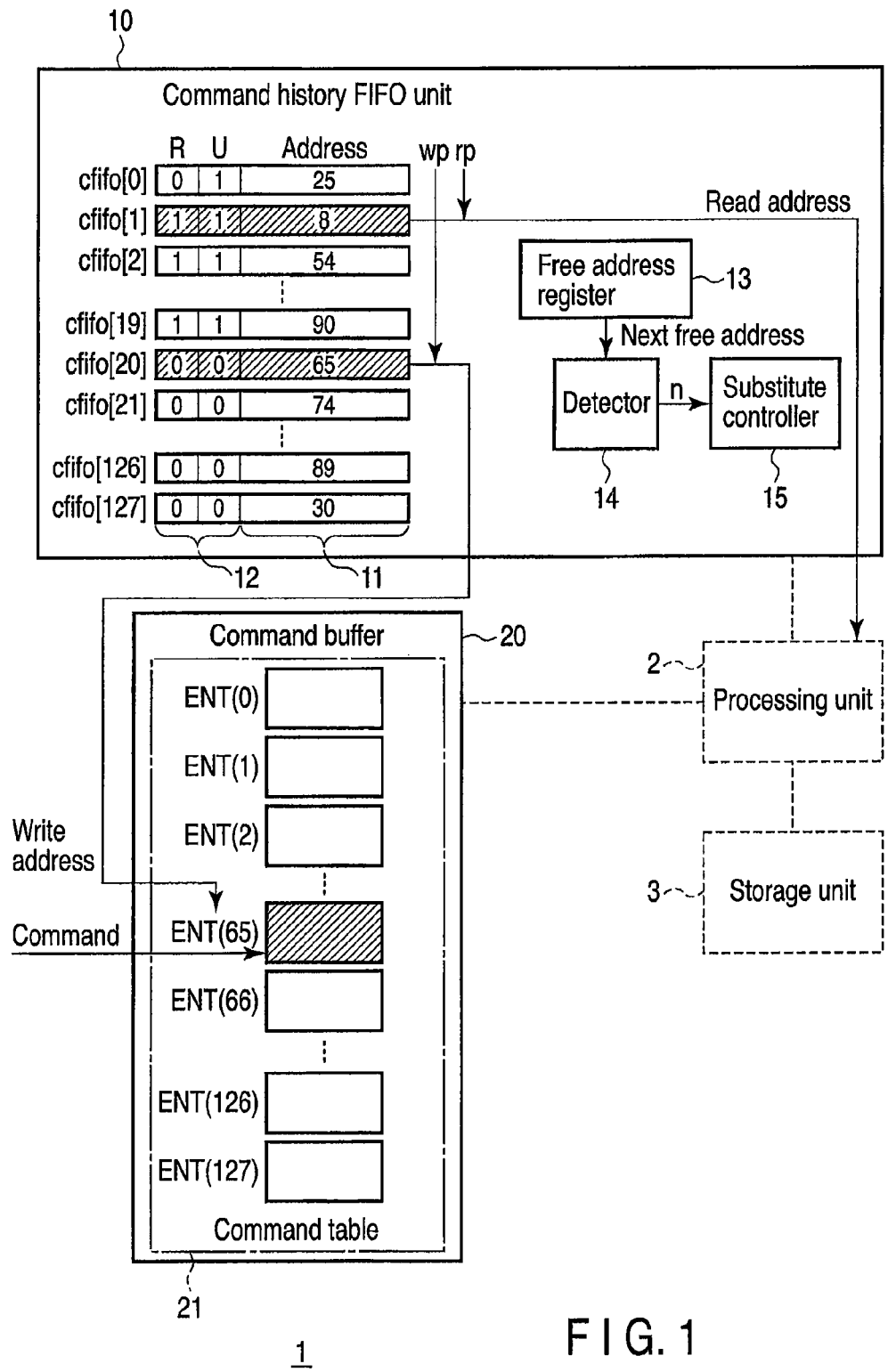
F I G. 1

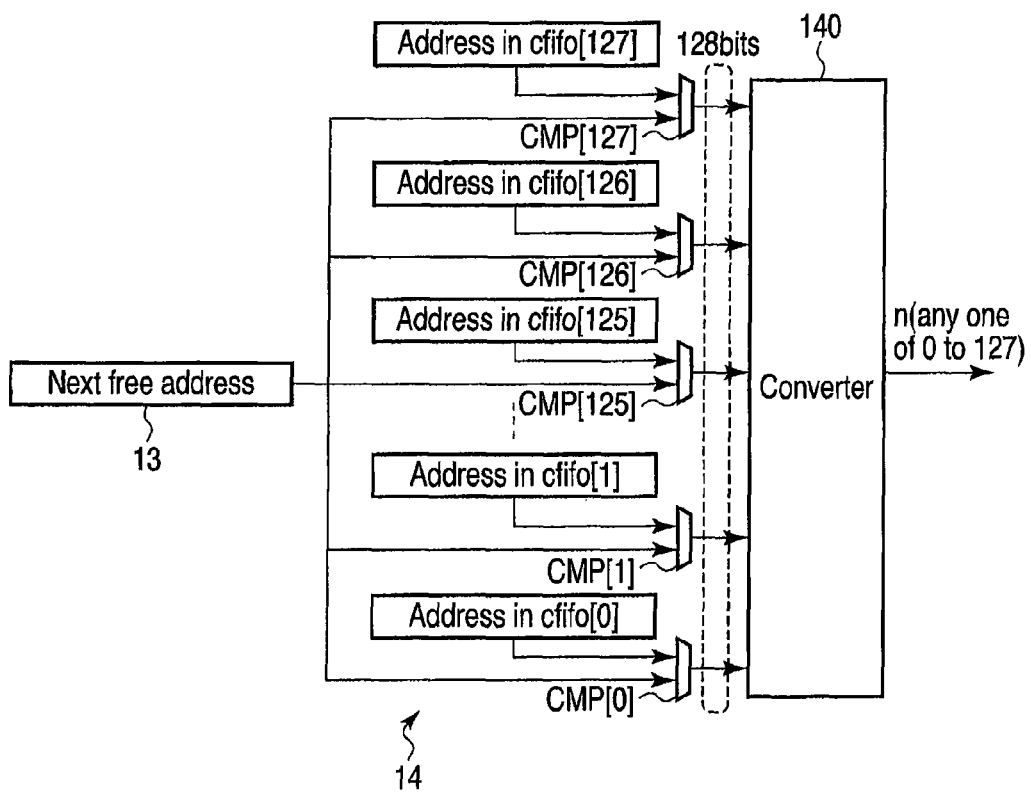
F I G. 11

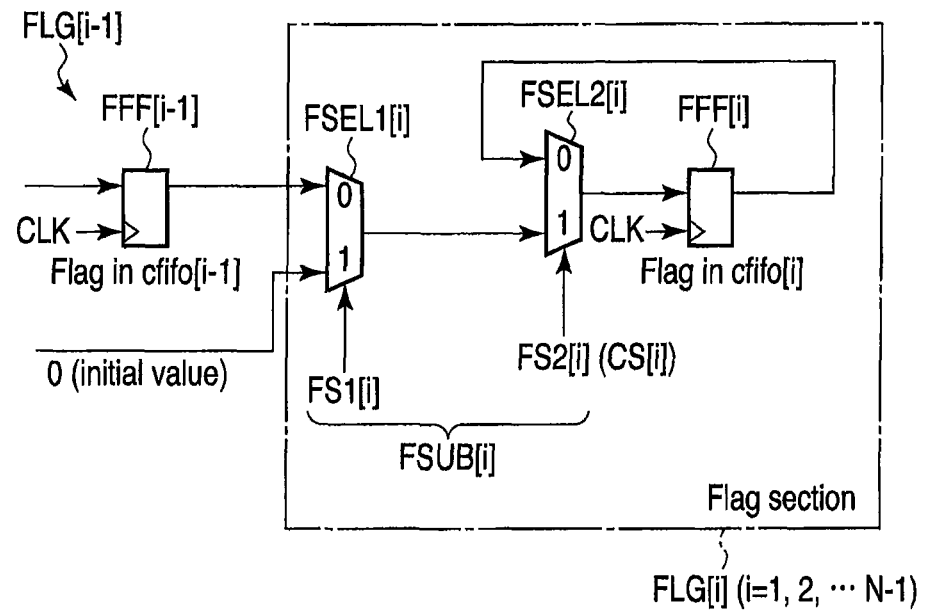
F I G. 14
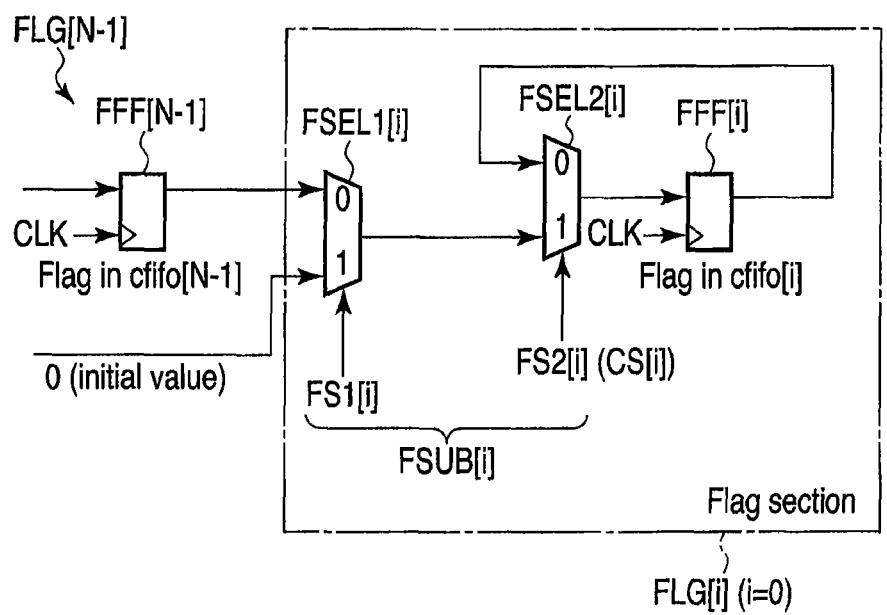
F I G. 15

US 8,473,649 B2

COMMAND MANAGEMENT DEVICE CONFIGURED TO STORE AND MANAGE RECEIVED COMMANDS AND STORAGE APPARATUS WITH THE SAME

CROSS-REFERENCE TO RELATED APPLICATIONS

This application is based upon and claims the benefit of priority from Japanese Patent Application No. 2010-166292, filed Jul. 23, 2010; the entire contents of which are incorporated herein by reference.

FIELD

Embodiments described herein relate generally to a command management device configured to store and manage commands received from a host, and a storage apparatus with the command management device.

BACKGROUND

A storage apparatus such as a hard disk drive (HDD) or a solid-state drive (SSD) generally comprises a host interface unit. The host interface unit controls data transfers between a host and the storage apparatus. The host interface unit comprises a command management device. The command management device receives commands such as read commands or write commands transferred by the host. The command management device then stores the received commands in a command buffer. The commands stored in the command buffer are unloaded into a processing unit in order of storage (that is, in the order in which the commands are stored) under the management of the command management device. The processing unit executes each of the unloaded commands.

When the execution of the command unloaded from the command buffer is completed, the command becomes unnecessary. Then, an area in the command buffer in which the unnecessary command is stored needs to be released (this area is hereinafter referred to as an unnecessary area). The release of such an unnecessary area (that is, maintenance of the command buffer) is carried out by software processing such as compaction or garbage collection.

On the other hand, in digital communication systems, a buffer management subsystem is known which comprises a data buffer configured to sequentially store received data. The buffer management subsystem comprises a first-in first-out buffer configured to store buffer pointers pointing to free spaces (that is, unnecessary areas) in the data buffer (this first-in first-out buffer is hereinafter referred to as a buffer pointer FIFO). The received data is stored in an area in the data buffer specified by a buffer pointer unloaded from the buffer pointer FIFO. A group of data stored in the data buffer is unloaded in order of storage and then transferred to relevant destinations. When data is unloaded from the data buffer, an area in the data buffer in which the unloaded data is stored becomes free. Thus, a buffer pointer pointing to this free area is stored in the buffer pointer FIFO.

With the above-described compaction or garbage collection, releasing an unnecessary area at a high speed is difficult. On the other hand, the order in which the execution of the commands stored in the command buffer is completed does not necessarily match the order in which the commands are unloaded from the command buffer. Thus, the physical sequence of the commands stored in the command buffer is significantly shifted from the unloading order (that is, the storage order) of the commands over time. Hence, in a command management device that needs to unload the commands stored in the command buffer, in order of storage, it is difficult to release an unnecessary area in the command buffer using the buffer pointer FIFO instead of the compaction or garbage collection.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of a command management device according to an embodiment;

FIG. 11 is a block diagram showing an exemplary configuration of a detector according to the embodiment;

FIG. 14 is a diagram showing an exemplary configuration of the i-th entry in a flag FIFO except the 0-th entry according to the embodiment;

FIG. 15 is a diagram showing an exemplary configuration of the i-th entry in the flag FIFO where "i" is "0" according to the embodiment;

DETAILED DESCRIPTION

Figure 2:
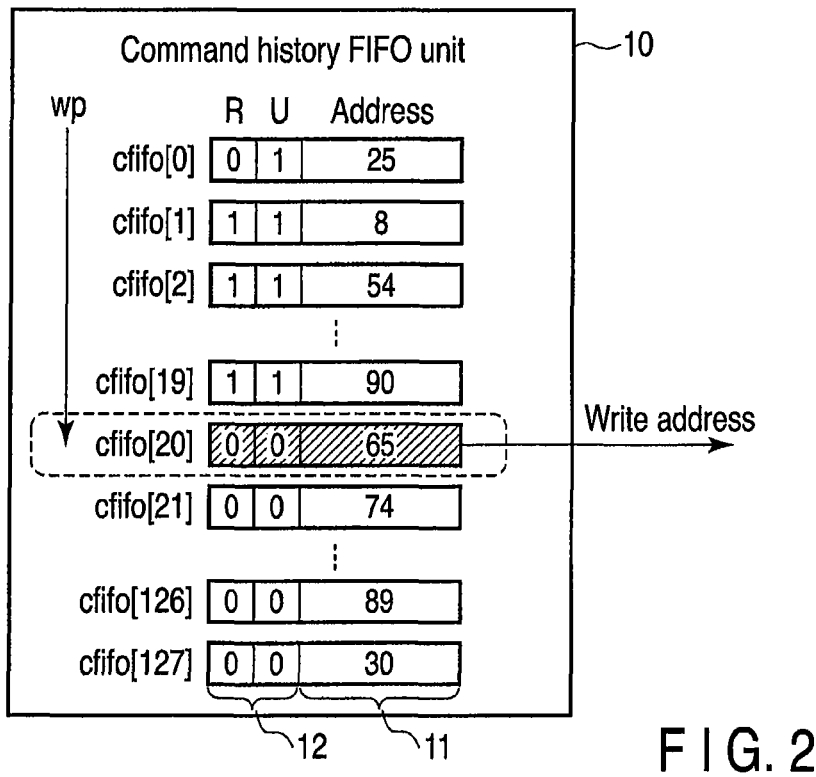
FIG. 2 is a diagram illustrating an exemplary operation performed during command storing according to the embodiment.

Various embodiments will be described hereinafter with reference to the accompanying drawings. In general, according to one embodiment, a command management device comprises a command buffer, a free address register and a FIFO unit with entries. The command buffer is configured to store commands received from a host. The entries comprise address sections configured to store addresses of the areas in the command buffer in which the respective commands are stored. The address sections are connected together like a ring. Each of the address sections comprises a substitute module configured to substitute either the free address held in the free address register or a second address stored in the address section preceding the each of the address sections for a first address stored in the each of the address sections.

FIG. 1 is a block diagram showing an exemplary configuration of a command management device according to an embodiment. In the embodiment, the command management device 1 is provided in a host interface unit of a storage apparatus such as a hard disk drive (that is a magnetic disk drive) or a solid-state drive. The storage apparatus comprises, besides the command management device 1, a processing unit 2 and a storage unit 3. The storage unit 3 includes a magnetic recording medium and a head if the storage apparatus is a hard disk drive (HDD) or a rewritable nonvolatile memory if the storage apparatus is a solid-state drive (SSD).

The command management device 1 comprises a command history FIFO unit 10 and a command buffer 20. The command buffer 20 is configured to store commands received from a host. The command buffer 20 comprises a table (hereinafter referred to as a command table) 21 with N entries ENT(0) to ENT(N−1). N is determined by the maximum number of commands simultaneously managed by the command management device 1. In the embodiment, N is 128, and the command management device 1 simultaneously manages up to 128 commands.

The command table 21 is implemented using a memory. The size (storage capacity) of each entry ENT(u) (u=0, 1, ..., 127) in the command table 21 depends on the length of a corresponding received command. Here, each command is assumed to be stored in the entry ENT(u) in the command table 21 via a 32-bit bus and that the command has a length of 8 words (1 word=32 bits). In this case, the size of each entry ENT(u) in the command table 21 is 32 bits×8=256 bits. Thus, in the embodiment, in which N is 128, the command table 21 comprises a memory with 32 bits×8×128=32768 bits=1024 words.

The command history FIFO unit 10 is used as a first-in first-out buffer unit configured to store and manage the respective addresses of the N (N=128) entries ENT(0) to ENT(N−1) in the command table 21 and flags each indicating the storage state of the corresponding command in one of the N (N=128) entries ENT(0) to ENT(N−1). The commands stored in the command table 21 are unloaded in order of storage under the management of the command history FIFO unit 10. The command history FIFO unit 10 comprises an address FIFO 11, a flag FIFO 12, a free address register 13, a detector 14, and a substitute controller 15.

The address FIFO 11 mainly comprises N m-bit flip-flops each configured to hold the m-bit addresses of the N (N=128) entries ENT(0) to ENT(N−1) in the command table 21. "m" denotes the number of binary data bits that can represent the numbers "0" to "N−1". In the embodiment, since N−1=127 (0x7F), m=7.

The flag FIFO 12 mainly comprises N flip-flop sets configured to hold flags each indicating the storage state of the corresponding command in one of the N entries ENT(0) to ENT(N−1). Each of the N flip-flop sets comprises k 1-bit flip-flops in order to hold k flags. k is determined by the number of the types of the managed flags. In the embodiment, two types of flags are to be managed, that is, an unread flag (R flag) and an in-use flag (U flag). Thus, k is 2. However, k may be increased if any other type of flag needs to be managed or reduced if any type of flag is unwanted.

The combination of the v-th (v=0, 1, ..., N−1) of the N (N=128) m-bit flip-flops in the address FIFO 11 and the v-th of the N flip-flop sets in the flag FIFO 12 is called the v-th entry or entry v in the address FIFO 11. The v-th entry or entry v in the address FIFO 11 is expressed as cfifo[v]. Furthermore, v is called the address (entry address) of cfifo[v], that is, the address (entry address) in the address FIFO 11 and the flag FIFO 12. A part of the address FIFO 11 which corresponds to cfifo[v] is called an address section of cfifo[v]. A part of the flag FIFO 12 which corresponds to cfifo[v] is called a flag section of cfifo[v].

The free address register 13 is used to set the address of, for example, the entry ENT(u) in the command table 21 to be a next free address if an unnecessary command is stored in the entry ENT(n). The free address register 13 is used for an address release process described below. The detector 14 and the substitute controller 15 will be described below.

The command history FIFO unit 10 also comprises a write pointer wp and a read pointer rp. Each of the write pointer wp and the read pointer rp has m bits (m=7). When a command such as a read command or a write command which is transferred by the host is stored in the command table 21, the write pointer wp points to the address "wp" of cfifo[wp] in which the address of an entry in the command table 21 is stored in which entry the command is to be stored. The address stored in the address section of cfifo[wp] specified by the write pointer wp is output to the command buffer 20 by the command history FIFO unit 10 as a write address.

The read pointer rp is used to unload the next command to be executed from the command table 21. The read pointer rp points to the address "rp" of cfifo[rp] in which the address of an entry in the command table 21 is stored in which entry the command to be unloaded is stored. The address stored in the address section of cfifo[wp] specified by the read pointer rp is output to the processing unit 2 by the command history FIFO unit 10 as a read address.

The processing unit 2 uses a read address output by the command history FIFO unit 10 to unload a command from the entry in the command table 21 specified by the read address. The processing unit 2 executes the unloaded command. If the unloaded command is a read command or a write command, the processing unit 2 reads or writes data from or to the storage unit 3. The processing unit 2 performs these operations, for example, in accordance with firmware.

Now, an operation performed during command storing according to the embodiment will be described with reference to FIG. 2. It is assumed that as a result of reception, by the host interface unit of the storage apparatus, of a command transferred by the host, a command storing operation is performed to store the received command in the command table 21 in the command management device 1. At this time, the write pointer wp in the command history FIFO unit 10 is assumed to be "20", indicating cfifo[20] in the command history FIFO unit 10 as shown in FIG. 2.

In this case, cfifo[20] indicated by the write pointer wp (=20) is selected. The address (in the example in FIG. 2, 65) stored in the address section of the selected cfifo[20] is output to the command buffer 20 as a write address. Thus, the command received from the host is stored in the entry ENT(65) in the command table 21, which is specified by the write address "65". The size of the command is assumed to be 8 words and that the data width of a bus used to transfer the command to the command buffer 20 is 32 bits. In this case, 8 bus cycles are required to store the command in the entry ENT(65) in the command table 21.

When the storing of the command in the command table 21 is completed, the R flag (more specifically, the R flag in the flag section) and U flag (more specifically, the U flag in the flag section) in cfifo[20] (that is, cfifo[20] pointed to by the write pointer wp) are each set. Furthermore, the write pointer wp is incremented. In this example, the write pointer wp is incremented from "20" to "21".

If "N−1" is a binary number and is expressed only by "1" as is the case with the embodiment, in which N=128, the write pointer wp may be incremented regardless of the current value of the write pointer wp. However, if "N−1" is a binary number but fails to be expressed only by "1" as in the case of, for example, 159, only when the write pointer wp points to "N−1", the write pointer wp is returned to 0 instead of being incremented. In the embodiment, the address "0" can be considered to be continuous from the address "N−1". This also applies to the read pointer rp. That is, in the embodiment, the write pointer wp and the read pointer rp are sequentially updated.

The address stored in the address section of cfifo[wp] pointed to by the write pointer wp is assumed to be "u". In this flag, the R flag in cfifo[wp] indicates that the command stored in the entry ENT(u) in the command table 21 specified by the address (hereinafter referred to as the corresponding address) "u" stored in the address section of cfifo[wp] has not been read yet. The U flag in cfifo[wp] indicates that the command stored in the entry ENT(u) in the command table 21 specified by the corresponding address "u" has not been completely executed yet, that is, the command is in use. In FIG. 2, wp=20 and u=65. When the U flag in cfifo[wp] pointed to by the write pointer wp is set, the reception of commands from the host may be restricted so as to prevent the currently uncompleted command from being overwritten with a new command.

Figure 3:
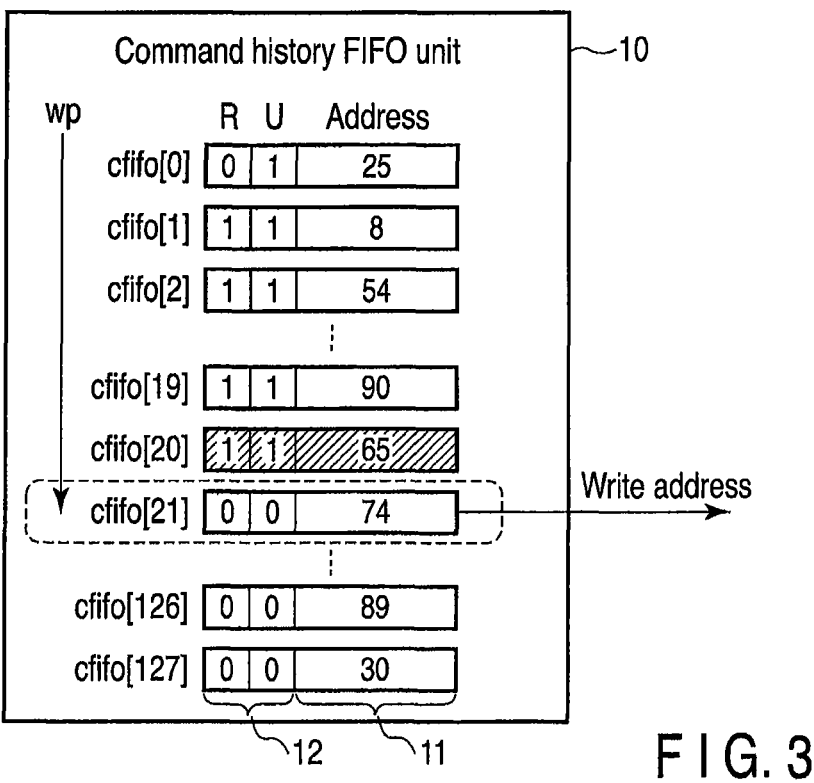
FIG. 3 is a diagram showing an exemplary state of a command history FIFO unit observed after the command storing shown in FIG. 2 is completed.

Now, an operation performed when the command storing is completed according to the embodiment will be described with reference to FIG. 3. FIG. 3 shows the state of the command history FIFO unit 10 observed after the command storing shown in FIG. 2 is completed. If the command storing shown in FIG. 2 is completed, the R flag and U flag in cfifo[20] are set and the write pointer wp is incremented from "20" to "21" as shown in FIG. 3. In this state, when a new command is received from the host, the address "74" stored in the address section of cfifo[21] is output to the command buffer 20 as a write address. Thus, the newly received command is stored in the entry ENT(74) in the command table 21.

Figure 4:
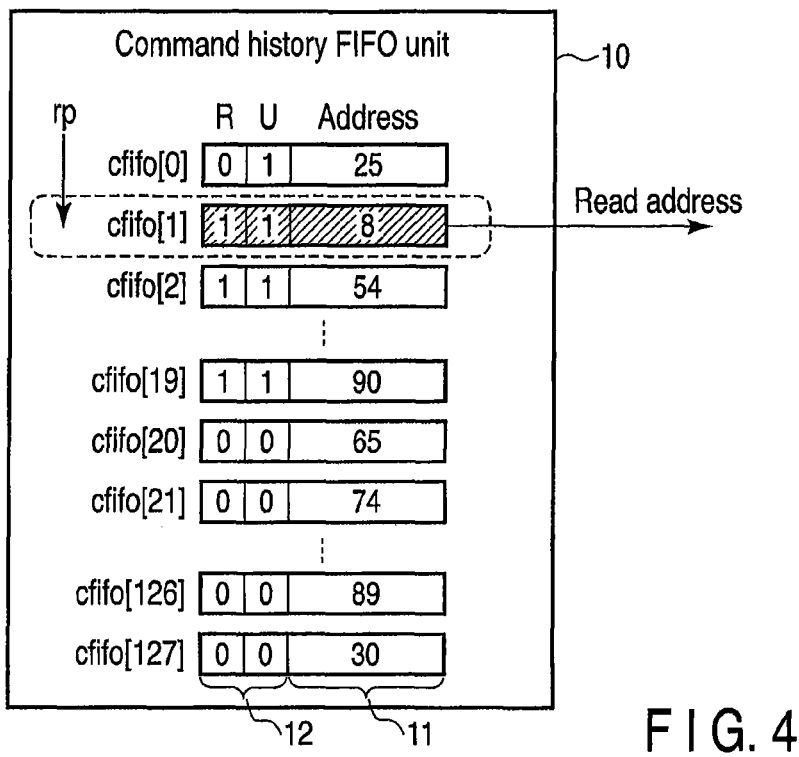
FIG. 4 a diagram illustrating an exemplary operation performed during command unloading according to the embodiment.

Now, an operation performed during command unloading according to the embodiment will be described with reference to FIG. 4. In the embodiment, the command unlading is carried out by the processing unit 2 in accordance with firmware. The read pointer rp in the command history FIFO unit 10 is assumed to be "1", indicating cfifo[1] in the command history FIFO unit 10 as shown in FIG. 4.

In the embodiment, the command history FIFO unit 10 is configured to output the address section (more specifically, the address stored in the address section) and flag section (more specifically, the R flag and U flag stored in the flag section) of cfifo[rp] pointed to by the read pointer rp, to the processing unit 2, in accordance with a read access to a given register area (hereinafter referred to s a CFIFO top section) by the processing unit 2. In the example in FIG. 4, rp=1. Thus, cfifo[1] is selected. The address "8" is stored in the address section of cfifo[1]. The address "8" is output to the processing unit 2 as a read address. The processing unit 2 uses the read address "8".

It is assumed that when the command history FIFO unit 10 outputs the read address "8", the R flag in the flag section output by the command history FIFO unit 10 has been set. In this case, the processing unit 2 can recognize that the command stored in the entry ENT(8) in the command table 21 specified by the address "8" has not been unloaded yet. Thus, the processing unit 2 accesses the CFIFO top section to access the command table 21 based on the address (read address) "8" read from the command history FIFO unit 10 (more specifically, cfifo[1] pointed to by the read pointer rp [=1]). Hence, the processing unit 2 unloads the command stored in the entry ENT(8) in the command table 21.

Upon completing the command unloading, the processing unit 2 clears the R flag in cfifo[1] (here, zero clear) and increments the read pointer rp. Alternatively, the read pointer rp may be automatically incremented in accordance with the completion of the command unloading by the processing unit 2. Similarly, the R flag may be automatically cleared in accordance with the completion of the command unloading by the processing unit 2.

Figure 5:
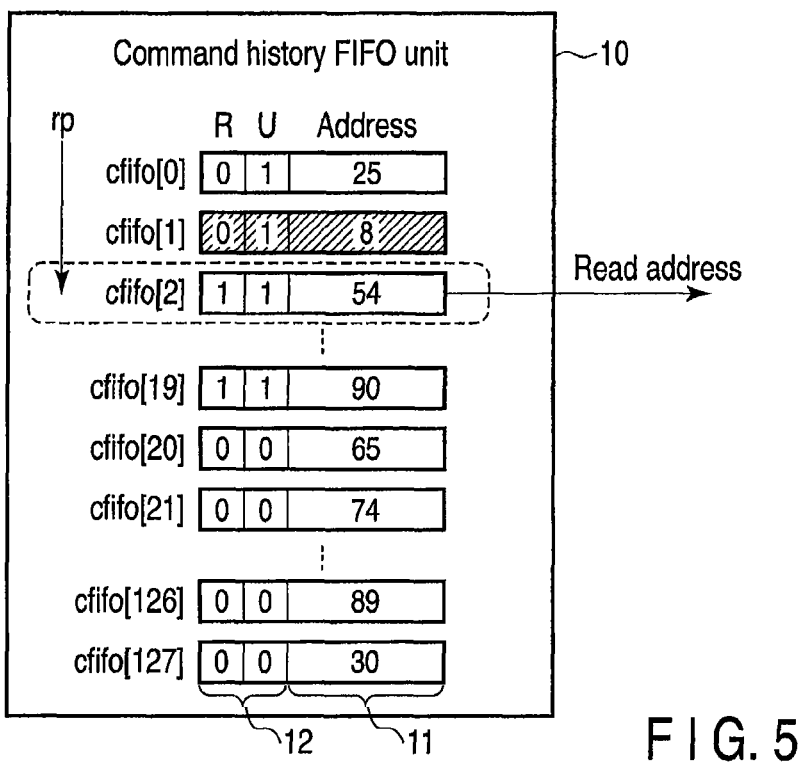
FIG. 5 is a diagram showing an exemplary state of the command history FIFO unit observed after the command unloading shown in FIG. 4 is completed.

Now, an operation performed when the command unloading is completed according to the embodiment will be described with reference to FIG. 5. FIG. 5 shows the state of the command history FIFO unit 10 observed after the command unloading shown in FIG. 4 is completed. If the command unloading shown in FIG. 4 is completed, the R flag in cfifo[1] is cleared and the read pointer rp is incremented from "1" to "2" as shown in FIG. 5. In this state, when the processing unit 2 performs a read access to the CFIFO top section, the address "54" stored in the address section of cfifo[2] is output to the processing unit 2 as a read address. The processing unit 2 can use the address "54" to unload the command stored in the entry ENT(54) in the command table 21. According to the embodiment, the processing unit 2 can perform such as an operation as described with reference to FIG. 2 to FIG. 5 to unload commands received from the host in order of reception.

Figure 6:
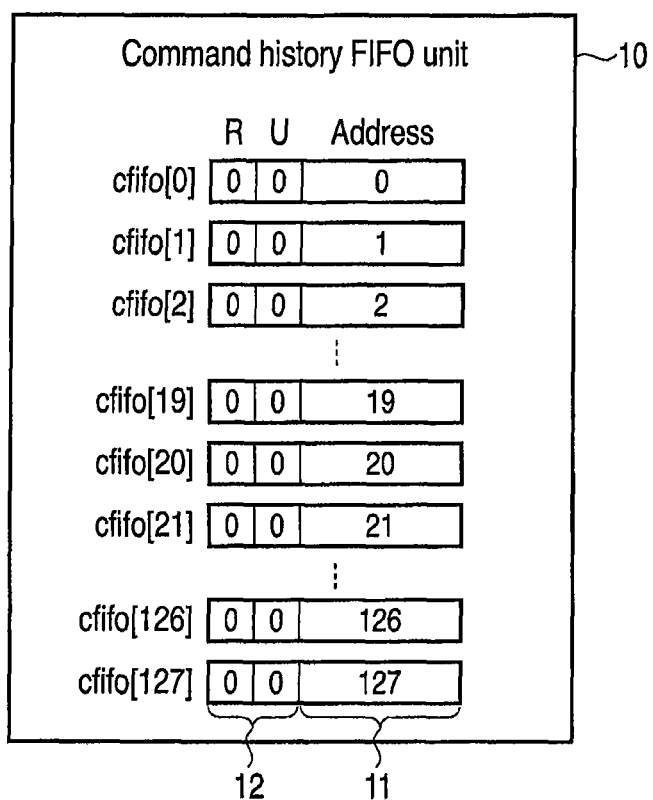
FIG. 6 is a diagram showing an example of an initial state of the command history FIFO unit according to the embodiment.

Now, the initial state of the command history FIFO unit 10 according to the embodiment will be described with reference to FIG. 6. As shown in FIG. 6, in the initial state of the command history FIFO unit 10, the R flags and U flags in all of cfifo[0] to cfifo[127] have been cleared. The addresses "0" to "127" are initially set in the address sections of cfifo[0] to cfifo[127]. Thus, in such an initial state, in the address FIFO 11 of the command history FIFO unit 10, the addresses "0" to "127" are arranged in ascending order. However, this arrangement is disrupted in accordance with repeated address release operations described below. The write pointer wp and the read pointer rp are each initially set to "0".

Figure 7:
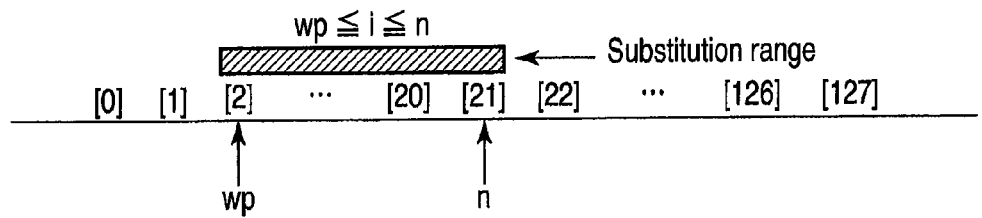
FIG. 7 is a diagram illustrating exemplary address release in a first state according to the embodiment.

Now, the address release in a first state according to the embodiment will be described with reference to FIG. 7. The first state refers to the case where wp≦n as described below. When a command unloaded from the command table 21 is completed, the command becomes unnecessary. Furthermore, when a command stored in the command table 21 is aborted instead of being executed, the command becomes unnecessary. Here, the entry (area) in the command table 21 in which the unnecessary command is stored is assumed to be ENT(u). Furthermore, the entry in the command history FIFO unit 10 in which the address "u" of the entry ENT(u) is stored is assumed to be the entry "n" (n is one of 0 to 127), that is, cfifo[n]. In this case, the address "u" is set in the free address register 13.

If the command stored in the entry ENT(u) in the command table 21 becomes unnecessary, the entry ENT(u) (that is, the entry ENT(u) in which the unnecessary command is stored) needs to be released. The address release refers to the release of the entry ENT(u) in the command table 21. Furthermore, the address "u" of the released entry ENT(u) in the command table 21 is called the released address. When the entry ENT(u) in the command table 21 is released, the address "u" of the entry ENT(u) is also released as described below. Additionally, the release of the address "u" of the entry ENT(u) is equivalent to the release of cfifo[n] in which the address "u" is stored.

In the embodiment, the address release is carried out by the processing unit 2 in accordance with firmware. When the address release is carried out by the processing unit 2, the released address "u" is migrated from the address section of the current cfifo[n] to the address section of cfifo[wp] in the command history FIFO unit 10 pointed to by the write pointer wp. Thus, cfifo[n] is also released. Furthermore, if the next command is received from the host, the command is stored in the entry ENT(u) in the command table 21 specified by the last released address "u".

A procedure for the address release carried out by the processing unit 2 will be described below. The address release is carried out in cooperation with the command history FIFO unit 10 in accordance with firmware. However, all of the address release may be carried out by hardware. The processing unit 2 sets the address "u" to be released, in the free address register 13 as a next free address. Then, the processing unit 2 activates the address release process.

Then, the command history FIFO unit 10 substitutes the next free address "u" set in the free address register 13 for the address section of cfifo[wp] pointed to by the write pointer wp. This substitution will be described below. At this time, both the R flag and U flag in cfifo[wp] are cleared (that is, return to the initial values).

The address "u" equal to the next free address "u" is reliably stored in the address section of one of cfifo[0] to cfifo[127] in the command history FIFO unit 10 (in the above-described example, the address section of cfifo[n]). However, it should be noted that in the embodiment, the address "u" used for substitution of the address section of cfifo[wp] is the next free address "u" set in the free address register 13.

If the free address register 13 is not applied, an output of a multiplexer with 127 inputs and 1 output needs to be connected to an input of cfifo[wp]. The multiplexer with 127 inputs and 1 output selects the address section of cfifo[n] in which the address "u" is stored, from the address sections of 127 cfifos, that is, cfifo[0] to cfifo[127] except cfifo[wp]. This also applies to the inputs of cfifo[0] to cfifo[127] except cfifo[wp].

At this time, the command history FIFO unit 10 needs to substitute entries in the command history FIFO unit 10 in order to ensure that the corresponding addresses can be read from the address FIFO 11 via the CFIFO top section in order of reception (storage) of the commands. As described above, the entry in the command history FIFO unit 10 in which the address "u" equal to the next free address "u" is stored is assumed to be the entry "n", that is, cfifo[n]. In the first state, in which "wp" is less than or equal to "n" (wp≦n), as shown in FIG. 7, the command history FIFO unit 10 substitutes the address sections and flag sections of cfifos[i] in the command history FIFO unit 10 specified by all the addresses "i" that are greater than or equal to wp and less than or equal to n (wp≦i≦n) as follows. A configuration for detecting n will be described below. In the example in FIG. 7, wp=2 and n=21.

a1) i=wp

When i=wp, the command history FIFO unit 10 performs substitution such that:

the address section in a new cfifo[i]=the next free address "u", the R flag in the new cfifo[i]=0 (the initial value of the R flag), and the U flag in the new cfifo[i]=0 (the initial value of the U flag).

a2) i is other than wp (wp<i≦n)

When wp<i≦n, the command history FIFO unit 10 performs substitution such that:

the address section in the new cfifo[i]=the address in the old cfifo[i−1], the R flag in the new cfifo[i]=the R flag in the old cfifo[i−1], and the U flag in the new cfifo[i]=the U flag in the old cfifo[i−1].

The address in the old cfifo[i−1] refers to the address stored in the address section of cfifo[i−1] preceding cfifo[i] before substitution.

Furthermore, when the read pointer rp points to one of the substitution entries in the command history FIFO unit 10 (wp≦rp≦n), the processing unit 2 increments the read pointer rp during the address release process. Alternatively, the read pointer may be automatically incremented during the address release process.

Figure 8:
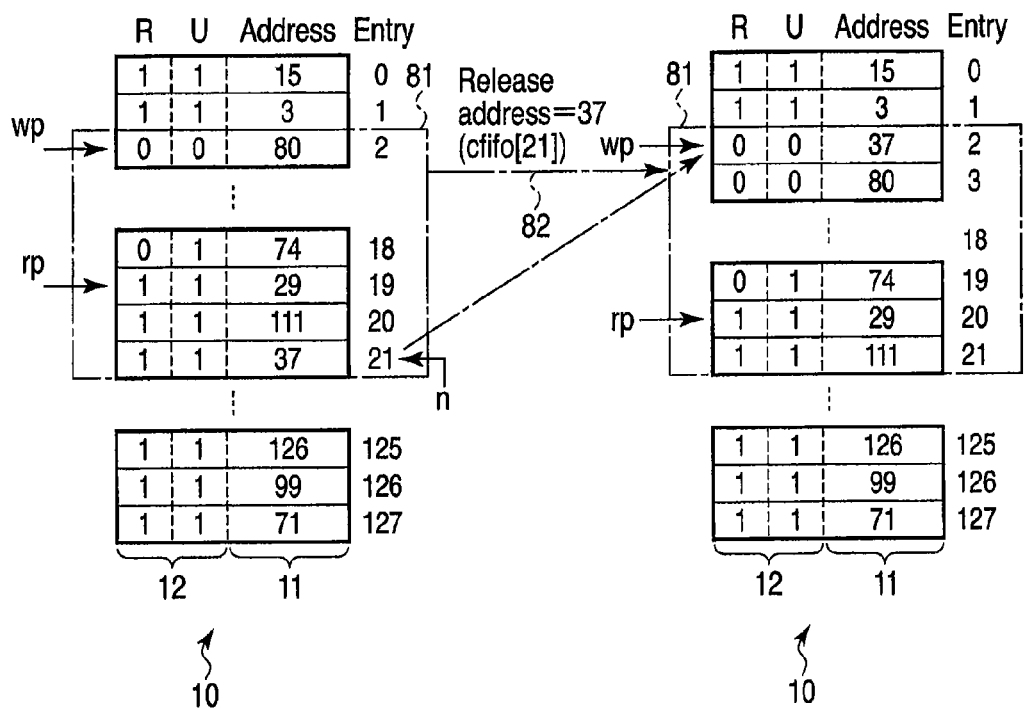
FIG. 8 is a diagram illustrating a specific example of the address release in the first state according to the embodiment.

Now, a specific example of the address release in the above-described first state (wp≦n) will be described with reference to FIG. 8. First, as shown in FIG. 8, the write pointer wp is assumed to be "2", and the read pointer rp is assumed to be "19". Furthermore, the next free address "u" (that is, the address to be released) set in the free address register 13 is assumed to be "37". The address "37" equal to the next free address "u" is assumed to be stored in the address section of cfifo[21] (n=21) in the command history FIFO unit 10. In this example, the range of the substitution entries "i" in the command history FIFO unit 10 is 2≦i≦21 as shown by a rectangle 81 in FIG. 8.

In this case, as shown by arrow 82 in FIG. 8, the command history FIFO unit 10 substitutes the range shown by the rectangle 81 so that:

the address section in the new cfifo[2]=the next free address "u"=37, the R flag in the new cfifo[2]=0, and the U flag in the new cfifo[2]=0, the address section in the new cfifo[3]=the address in the old cfifo[2]=80, the R flag in the new cfifo[3]=the R flag in the old cfifo[2]=0, and the U flag in the new cfifo[3]=the U flag in the old cfifo[2]=0, . . .

the address section in the new cfifo[20]=the address in the old cfifo[19]=29, the R flag in the new cfifo[20]=the R flag in the old cfifo[19]=1, and the U flag in the new cfifo[20]=the U flag in the old cfifo[19]=1, the address section in the new cfifo[21]=the address in the old cfifo[20]=111, the R flag in the new cfifo[21]=the R flag in the old cfifo[20]=1, and the U flag in the new cfifo[21]=the U flag in the old cfifo[20]=1.

cfifos[i] in the command history FIFO unit 10 which are not included within the range 2≦i≦21 remain unchanged. Furthermore, in the example in FIG. 8, the read pointer rp is "19", indicating one of the substitution entries in the command history FIFO unit 10 (2≦rp≦21). Thus, the read pointer rp is incremented from "19" to "20".

As described above, according to the embodiment, the following are released: the entry ENT(37) in the command table 21 specified by the next free address "37" in which the command in use (U flag=1) is stored, the address "37" specifying the entry ENT(37), and cfifo[21] (n=21) in the command history FIFO unit 10 in which the address "37" is stored. Thus, when the next command is received from the host, the next command is stored in the released entry ENT (37) in the command table 21.

Now, a specific example of the address release in a second state will be described with reference to FIG. 9. The second state refers to the case where "wp" is greater than "n" (n<wp). Also in this case, the entry in the command history FIFO unit 10 in which the address "u" equal to the next free address "u" set in the free address register 13 is stored is assumed to be cfifo[n].

Figure 9:
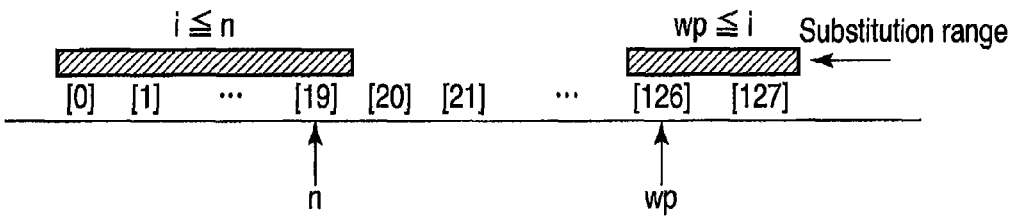
FIG. 9 is a diagram illustrating exemplary address release in a second state according to the embodiment.

Also in the example in FIG. 9, the processing unit 2 activates the address release process to allow the command history FIFO unit 10 to substitute the next free address "u" set in the free address register 13 for the address section of cfifo[wp] pointed to by the write pointer wp. At this time, both the R flag and U flag in cfifo[wp] are cleared.

Furthermore, the command history FIFO unit 10 substitutes the address sections and flag sections of cfifos[i] in the command history FIFO unit specified by all the addresses [i] that are less than or equal to n (i≦n) and all the addresses "i" that are greater than or equal to wp (wp≦i), as follows. In this case, the lower limit of the address "i" is "0". The upper limit of the address "i" is 127. In the example in FIG. 9, wp=126 and n=19.

b1) i=wp

When i=wp, the command history FIFO unit 10 performs substitution such that:

the address section in the new cfifo[i]=the next free address "u", the R flag in the new cfifo[i]=0 (the initial value of the R flag), and the U flag in the new cfifo[i]=0 (the initial value of the U flag).

b2) i is other than wp (i≦n or wp<i)

When i≦n (0≦i≦n) or wp<i (wp<i≦127), the command history FIFO unit 10 performs substitution such that:

the address section in the new cfifo[i]=the address in the old cfifo[i−1], the R flag in the new cfifo[i]=the R flag in the old cfifo[i−1], and the U flag in the new cfifo[i]=the U flag in the old cfifo[i−1].

However, the new cfifo[0] is substituted with the content of the old cfifo[127].

Furthermore, when the read pointer rp points to one of the substitution entries in the command history FIFO unit 10 (rp≦n or wp≦rp), the processing unit 2 increments the read pointer rp during the address release process.

Figure 10:
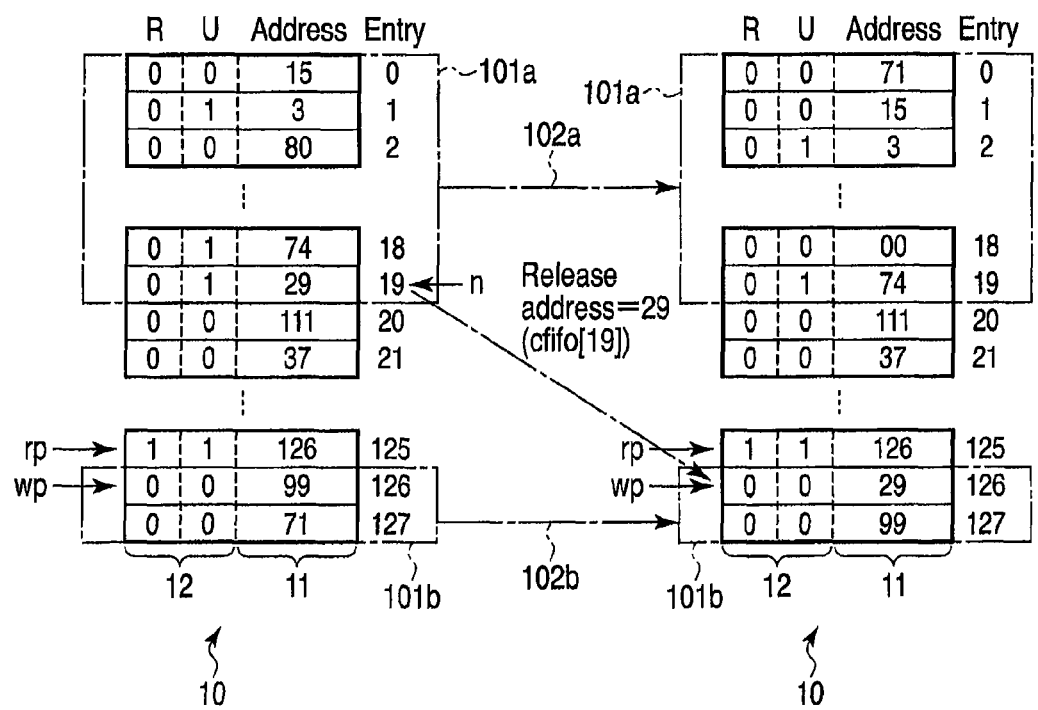
FIG. 10 is a diagram illustrating a specific example of the address release in the second state according to the embodiment.

Now, a specific example of the address release in the above-described second state (n<wp) will be described with reference to FIG. 10. First, as shown in FIG. 10, the write pointer wp is assumed to be "126", and the read pointer rp is assumed to be "125". Furthermore, the next free address "u" set in the free address register 13 is assumed to be "29". The address "29" equal to the next free address "u" is assumed to be stored in the address section of cfifo[19] (n=19) in the command history FIFO unit 10. In this example, the range of the substitution entries "i" in the command history FIFO unit 10 is i≦19 (0≦i≦19) as shown by a rectangle 101a in FIG. 10 and 126≦i (126≦i≦127) as shown by a rectangle 101b in FIG. 10.

In this case, as shown by arrow 102a in FIG. 10, the command history FIFO unit 10 substitutes the range shown by the rectangle 101a so that:

the address section in the new cfifo[0]=the address in the old cfifo[127]=71, the R flag in the new cfifo[0]=the R flag in the old cfifo[127]=0, and the U flag in the new cfifo[0]=the U flag in the old cfifo[127]=0, the address section in the new cfifo[1]=the address in the old cfifo[0]=15, the R flag in the new cfifo[1]=the R flag in the old cfifo[0]=0, and the U flag in the new cfifo[1]=the U flag in the old cfifo[0]=0, . . .

the address section in the new cfifo[19]=the address in the old cfifo[18]=74, the R flag in the new cfifo[19]=the R flag in the old cfifo[18]=0, and the U flag in the new cfifo[19]=the U flag in the old cfifo[18]=1.

Furthermore, as shown by arrow 102b in FIG. 10, the command history FIFO unit 10 substitutes the range shown by the rectangle 101b so that:

the address section in the new cfifo[126]=the next free address "u"=29, the R flag in the new cfifo[126]=0, and the U flag in the new cfifo[126]=0, the address section in the new cfifo[127]=the address in the old cfifo[126]=99, the R flag in the new cfifo[127]=the R flag in the old cfifo[126]=0, and the U flag in the new cfifo[127]=the U flag in the old cfifo[126]=0.

cfifos[i] in the command history FIFO unit 10 which are included within the range 20≦i≦125 remain unchanged. Furthermore, in the example in FIG. 10, the read pointer rp is "125", indicating no substitution entry in the command history FIFO unit 10. Thus, the read pointer rp fails to be incremented.

As described above, according to the embodiment, the following are released: the entry ENT(29) in the command table 21 specified by the next free address "29" in which the command in use (U flag=1) is stored, the address "29" specifying the entry ENT(29), and cfifo[19] (n=19) in the command history FIFO unit 10 in which the address "29" is stored. Thus, when the next command is received from the host, the next command is stored in the released entry ENT (29) in the command table 21.

Now, the configuration of the detector 14 shown in FIG. 1 will be described. FIG. 11 is a block diagram showing the configuration of the detector 14. The detector 14 detects the address "n" of the entry (cfifo[n]) in the command history FIFO unit 10 in which the address equal to the next free address set in the free address register 13 is stored. The detector 14 comprises 128 (n=128) comparators CMP[0] to CMP[127] and a converter 140.

The comparator CMP[i] (i=0, 1, . . . , 127) compares the next free address set in the free address register 13 with the address stored in the address section of cfifo[i] of the command history FIFO unit 10 (that is, the address in cfifo[i]). The comparator CMP[i] then outputs a 1-bit comparison result. A comparison result of "1" indicates that the next free address is equal to the address in cfifo[i]. A comparison result of "0" indicates that the next free address is different from the address in cfifo[i].

It is assumed that a comparator CMP[n] (n is one of 0 to 127), one of the comparators CMP[0] to CMP[127], outputs a comparison result of "1". In this case, the converter 140 converts a combination of comparison results from the comparators CMP[0] to CMP[127] into the address "n" of cfifo[n] corresponding to the comparator CMP[n]. That is, the converter 140 converts a bit string corresponding to the combination of comparison results from the comparators CMP[0] to CMP[127] in accordance with the position of the comparison result of 1 in the bit string, as follows.

The converter 140 converts the bit string into the address "n" as follows.

When the comparison results from the comparators CMP [0] to CMP[127] are "128'b00000000000...0000001", n=0.

When the comparison results from the comparators CMP [0] to CMP[127] are "128'b00000000000...0000010", n=1.

When the comparison results from the comparators CMP [0] to CMP[127] are "128'b00000000000 . . . 0000100", n=2 . . . .

When the comparison results from the comparators CMP [0] to CMP[127] are "128'b01000000000 . . . 0000000", n=126.

When the comparison results from the comparators CMP [0] to CMP[127] are "128'b10000000000 . . . 0000000", n=127.

"128'b" indicates that the subsequent bit string has 128 bits.

As described above, the next free address and the addresses in cfifo[0] to cfifo[127] are input to the detector 14 shown in FIG. 11. However, in FIG. 1, the addresses in cfifo[0] to cfifo[127], included in the inputs to the detector 14, are omitted for simplification.

Figure 12:
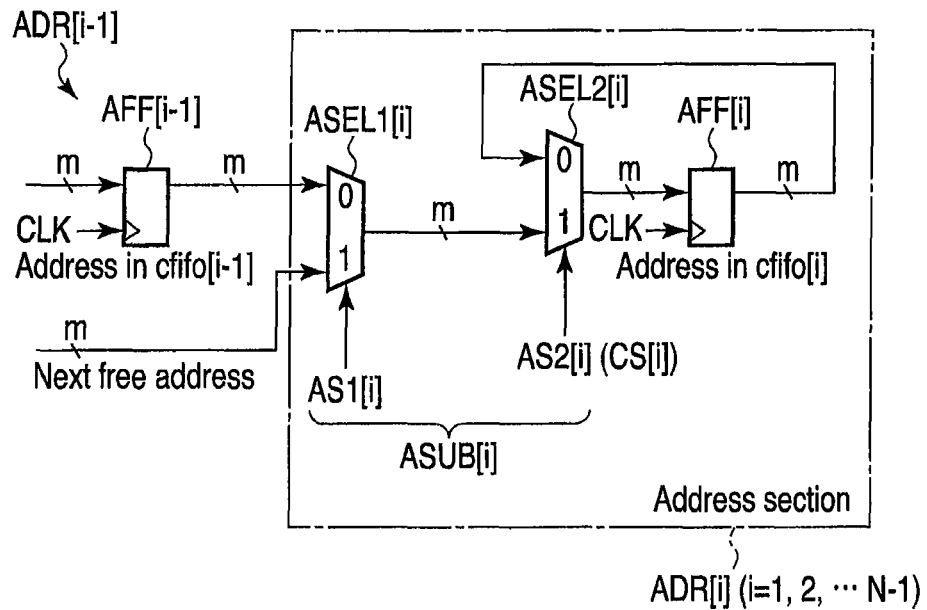
FIG. 12 is a diagram showing an exemplary configuration of the i-th entry in an address FIFO except the 0-th entry according to the embodiment.

Now, the configuration of the address FIFO 11 of the command history FIFO unit 10 shown in FIG. 1 will be described. As described above, the address FIFO 11 mainly comprises N m-bit flip-flops. FIG. 12 is a block diagram showing the configuration (N=128) of the i-th entry (i=1, 2, ..., N−1) in the address FIFO 11 except the 0-th entry, that is, the configuration of the address section ADR[i] of cfifo[i] in the command history FIFO unit 10.

The address section ADR[i] comprises a selector (first selector) ASEL1[$i$], a selector (second selector) ASEL2[$i$], and an m-bit (m=7) flip-flop AFF[i]. The selector ASEL[i] selects either an output (the address in cfifo[i−1]) from the flip-flop AFF[i−1] contained in the address section ADR[i−1] or the next free address set in the free address register 13 in accordance with a selection signal AS1[$i$]. The selection signal AS1[$i$] is "1" if the write pointer wp points to the address (entry) "i" (i=wp) and otherwise "0" (i≠wp). The selector ASEL1[$i$] selects the next free address if the selection signal AS1[$i$] is "1" and selects the address in cfifo[i−1] if the selection signal AS1[$i$] is "0".

The selector ASEL2[$i$] selects an output (the address in cfifo[i]) from the flip-flop AFF[i] or the address selected by the selector ASEL1[$i$] in accordance with a selection signal AS2[$i$]. The selection signal AS2[$i$] is "1" if "i" meets a condition (hereinafter referred to as a substitution condition) for substituting cfifo[i] (more specifically, the address section and flag section of cfifo[i]), and otherwise "0". The selector ASEL2[$i$] selects the address selected by the selector ASEL1 [$i$] if the selection signal AS2[$i$] is "1". The selector ASEL2[$i$] selects the address in cfifo[i] if the selection signal AS2[$i$] is "0". A condition match signal CS[i] indicating whether or not "i" meets the substitution condition is used as the selection signal AS2[$i$].

The flip-flop AFF[i] forms a main part of the address section of cfifo[i]. The flip-flop AFF[i] holds the address selected by the selector ASEL2[$i$] as an address to be stored in the address section of cfifo[i], in accordance with a clock signal CLK. The selectors ASEL1[$i$] and ASEL2[$i$] form a substitute module ASUB[i] that substitutes the address stored in the address section (flip-flop AFF[i]) of cfifo[i].

Figure 13:
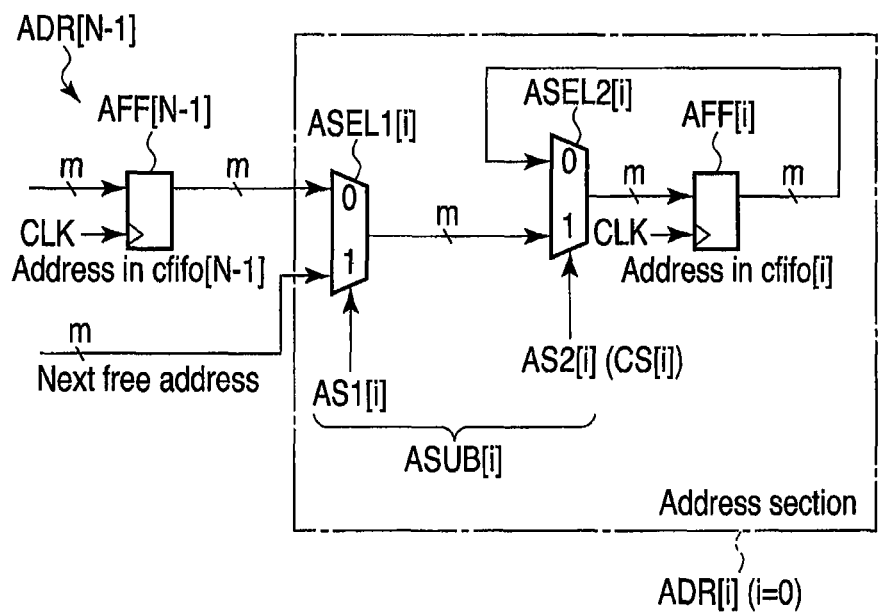
FIG. 13 is a diagram showing an exemplary configuration of the i-th entry in the address FIFO where "i" is "0" according to the embodiment.

FIG. 13 is a block diagram showing the configuration of an entry i in the address FIFO 11 where "i" is "0", that is, the configuration of the address section ADR[i] of cfifo[i] in the command history FIFO unit 10. The configuration of the address section ADR[i] (i=0) shown in FIG. 13 is similar to that of the address section ADR[i] (i=1, 2, ..., N−1) shown in FIG. 12. However, in the address section ADR[i] (i=0) shown in FIG. 13, instead of the address in cfifo[i−1], the address in cfifo[N−1], that is, an output from the flip-flop AFF[N−1] contained in the address section ADR[N−1] is used as one input to the selector ASEL1[$i$].

As is apparent from the above-described configuration of the address FIFO 11, the address sections ADR[0] to ADR [N−1] (N=128) of cfifo[0] to cfifo[N−1] are connected together like a ring. Thus, the address section ADR[i] is preceded by the address section ADR[i−1] if i≠0 and by the address section ADR[N−1] if i=0. For the address section ADR[i] (i=0, 1, ..., N−1), if "i" fails to meet the substitution condition, an output from the flip-flop AFF[i] is selected as an input to this flip-flop AFF[i]. In this case, the value of the flip-flop AFF[i], that is, the value of the address section of cfifo[i], is held.

When the address release process allows "i" to meet the substitution condition, if i=wp, then the next free address set in the free address register 13 is selected as an input to the flip-flop AFF[i]. In this case, the value of the flip-flop AFF[i], that is, the value of the address section of cfifo[i]], is substituted with the next free address.

On the other hand, even when the address release process allows "i" to meet the substitution condition, if i≠wp and i≠0, the value of the flip-flop AFF[i−1] in the address section ADR[i−1] preceding the address section ADR[i], that is, the address stored in the address section of cfifo[i−1], is selected as an input to the flip-flop AFF[i]. In this case, the value of the flip-flop AFF[i], that is, the value of the address section of cfifo[i]], is substituted with the address stored in the address section of cfifo[i−1]. Then, if i≠wp and i=0, the value of the flip-flop AFF[N−1] in the address section ADR[N−1] preceding the address section ADR[i] (address section ADR[0]), that is, the address stored in the address section of cfifo[N−1], is selected as an input to the flip-flop AFF[i]. In this case, the value of the flip-flop AFF[i], that is, the value of the address section of cfifo[i], is substituted with the address stored in the address section of cfifo[N−1].

Now, the configuration of the flag FIFO 12 of the command history FIFO unit 10 shown in FIG. 1 will be described. As described above, the flag FIFO 12 mainly comprises N (N=128) flip-flop sets each comprising k 1-bit flip-flops in order to hold k (k=2) flags. That is, the flag FIFO 12 mainly comprises N 1-bit flip-flops for one type of flag.

FIG. 14 is a block diagram showing the configuration of the i-th entry (i=1, 2, ..., N−1) in the flag FIFO 12 except the 0-th entry (N=128), that is, the configuration of the flag section FLG[i] of cfifo[i] in the command history FIFO unit 10. The flag section FLG[i] comprises a selector FSEL1[$i$], a selector FSEL2[$i$], and a flip-flop FFF[i].

The selector FSEL1[$i$] selects either an output (the flag held in the flag section of cfifo[i−1], that is, the flag in cfifo [i−1]) from the flip-flop FFF[i−1] contained in the flag section FLG[i−1], or the initial value "0" of the flag, in accordance with a selection signal FS1[$i$]. The selection signal FS1[$i$] is "1" if the write pointer wp points to the address (entry) "i" (i=wp) and otherwise "0" (i≠wp). The selection signal FS1[$i$]

matches the selection signal AS1[$i$]. The selector FSEL1[$i$] selects the initial value "0" of the flag if the selection signal FS1[$i$] is "1" and selects the flag in cfifo[i−1] if the selection signal FS1[$i$] is "0".

The selector FSEL2[$i$] selects either an output (the flag in cfifo[i]) from the flip-flop FFF[i] or the flag selected by the selector FSEL1[$i$] in accordance with a selection signal FS2[$i$]. The selection signal FS2[$i$] is "1" if "i" meets the substitution condition and otherwise "0". The selector FSEL2[$i$] selects the flag selected by the selector FSEL1[$i$] if the selection signal FS2[$i$] is "1". The selector FSEL2[$i$] selects the flag in cfifo[i] if the selection signal FS2[$i$] is "0". As is the case with the selection signal AS2[$i$], the condition match signal CS[i] is used as the selection signal FS2[$i$].

The flip-flop FFF[i] forms a main part of the flag section of cfifo[i]. The flip-flop FFF[i] holds the flag selected by the selector FSEL2[$i$] as a flag to be stored in the flag section of cfifo[i], in accordance with the clock signal CLK. The selectors FSEL1[$i$] and FSEL2[$i$] form a substitute module FSUB [i] that substitutes the flag stored in the flag section (flip-flop FFF[i]) of cfifo[i].

FIG. 15 shows the configuration of the entry i in the flag FIFO 12 where "i" is "0", that is, the configuration of the flag section FLG[i] of cfifo[i] in the command history FIFO unit 10. The configuration of the flag section FLG[i] (i=0) shown in FIG. 15 is similar to that of the flag section FLG[i] (i=1, 2, . . . , N−1) shown in FIG. 14. However, in the flag section FLG[i] (i=0) shown in FIG. 15, instead of the flag in cfifo[i−1], the flag in cfifo[N−1], that is, an output from the flip-flop FFF[N−1] contained in the flag section FLG[N−1], is used as one input to the selector FSEL1[$i$].

As is apparent from the above-described configuration of the flag FIFO 12, the flag sections FLG[0] to FLG[N−1] (N=128) of cfifo[0] to cfifo[N−1] are connected together like a ring. Thus, the flag section FLG[i] is preceded by the flag section FLG[i−1] if i≠0 and by the flag section FLG[N−1] if i=0. For the flag section FLG[i] (i=0, 1, . . . , N−1), if "i" fails to meet the substitution condition, an output from the flip-flop FFF[i] is selected as an input to this flip-flop FFF[i]. In this case, the value of the flip-flop FFF[i], that is, the value of the flag section of cfifo[i], is held.

When the address release process allows "i" to meet the substitution condition, if i=wp, then the initial value "0" of the flag is selected as an input to the flip-flop FFF[i]. In this case, the value of the flip-flop FFF[i], that is, the value of the flag section of cfifo[i]], is the initial value "0".

On the other hand, even when the address release process allows "i" to meet the substitution condition, if i≠wp and i≠0, then the value of the flip-flop FFF [i−1] in the flag section FLG[i−1] preceding the flag section FLG[i], that is, the flag stored in the flag section of cfifo[i−1], is selected as an input to the flip-flop FFF[i]. In this case, the value of the flip-flop FFF[i], that is, the value of the flag section of cfifo[i]], is substituted with the flag stored in the flag section of cfifo[i−1]. Then, if i≠wp and i=0, the value of the flip-flop FFF[N−1] in the flag section FLG[N−1] preceding the flag section FLG [i] (flag section FLG[0]), that is, the flag stored in the flag section of cfifo[N−1], is selected as an input to the flip-flop FFF[i]. In this case, the value of the flip-flop FFF[i], that is, the value of the flag section of cfifo[i], is substituted with the flag stored in the flag section of cfifo[N−1]. The initial value of the flag need not necessarily be "0" but may be "1".

Figure 16:
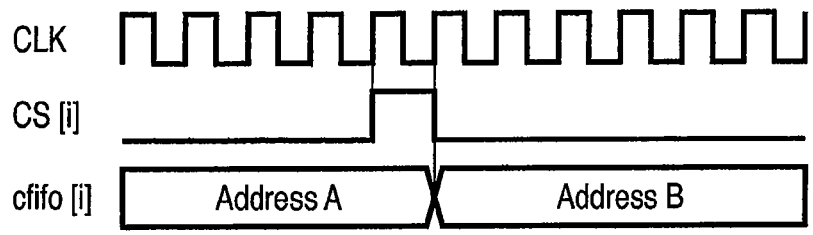
FIG. 16 is an exemplary timing chart showing that an address A is substituted with an address B stored in the i-th entry in the address FIFO during the address release according to the embodiment.

FIG. 16 is a timing chart showing that an address B is substituted with an address A in the i-th entry (address section ADR[i]) in the address FIFO 11, that is, in the address section of cfifo[i] during the address release according to the embodiment. First, it is assumed that the address A is stored in the address section (ADR[i]) of cfifo[i]. In this state, when the address release process allows "i" to meet the substitution condition, the address A stored in the address section of cfifo[i] is substituted with the address B. Here, as described above, the address B is the next free address (for i=wp), the address in cfifo[i−1] (i≠wp and i≠0), or the address in cfifo [N−1] (i≠wp and i=0).

As is apparent from the timing chart in FIG. 16, according to the embodiment, if "i" meets the substitution condition, the condition match signal CS[i] used as the selection signal AS2[$i$] (and FS2[$i$]) is switched to and remains at "1" during one cycle of the clock signal CLK in which a substitution trigger signal TRG described below is output. Simply by carrying out this switching, that is, simply by switching the input to the flip-flop AFF[i], the address release process (address substitution) is completed within one cycle of the clock signal CLK. In the flag section FLG[i] in the flag FIFO 12, that is, in the flag section of cfifo[i], the flag is substituted at a timing similar to that in the timing chart shown in FIG. 16.

That is, in the embodiment, the entry ENT(u) in the command table 21 in which an unnecessary command is stored, the address "u" in the entry ENT(u), and cfifo[n] in the command history FIFO unit 10 can be released at a high speed without using compaction or garbage collection. cfifo[n] is configured to store the flag indicating the storage state of the command in the entry ENT(u) (that is, the state in which the command is stored in the entry ENT(u)). Furthermore, the embodiment can complete substitution of the entries within the substitution range stored in the command history FIFO unit 10, within one cycle of the clock signal CLK; the entries need to be subjected to substitution in order to ensure that the corresponding addresses can be read from the address FIFO 11 in order of reception (storage) of the commands.

Figure 17:
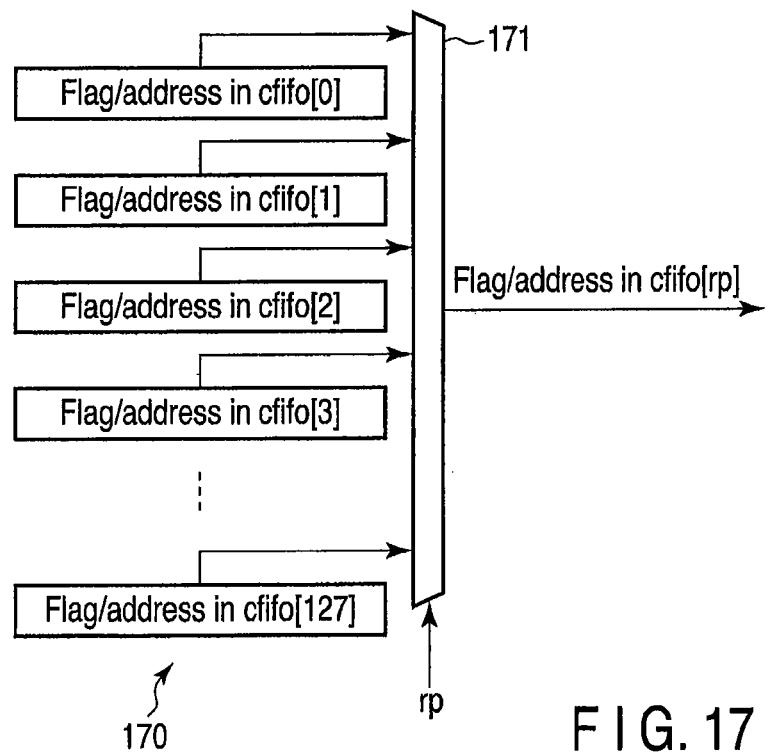
FIG. 17 is a block diagram showing an exemplary configuration of a selection unit according to the embodiment.

FIG. 17 is a block diagram showing the configuration of a selection unit 170. The selection unit 170 unloads the address section and flag section of the rp-th entry (cfifo[rp]) in the command history FIFO unit 10 pointed to by the read pointer rp in accordance with a read access by the processing unit 2 to the CFIFO top section. The selection unit 170 comprises a multiplexer 171. The multiplexer 171 receives the address sections and flag sections of cfifo[0] to cfifo[127] (N=128). The multiplexer 171 selects the address section and flag section of cfifo[rp] pointed to by the read pointer rp from the address sections and flag sections of cfifo[0] to cfifo[127] (N=128). The values of the selected address and flag sections of cfifo[rp] are output to the processing unit 2.

Now, the configuration of the substitution controller 15 shown in FIG. 1 will be described. The substitution controller 15 detects whether "i" meets the substitution condition for each cfifo[i] (i=0, 1, . . . , 127) in the command history FIFO unit 10. The substitution controller 15 controls substitution intended for cfifo[i] in accordance with the result of the detection.

Figure 18:
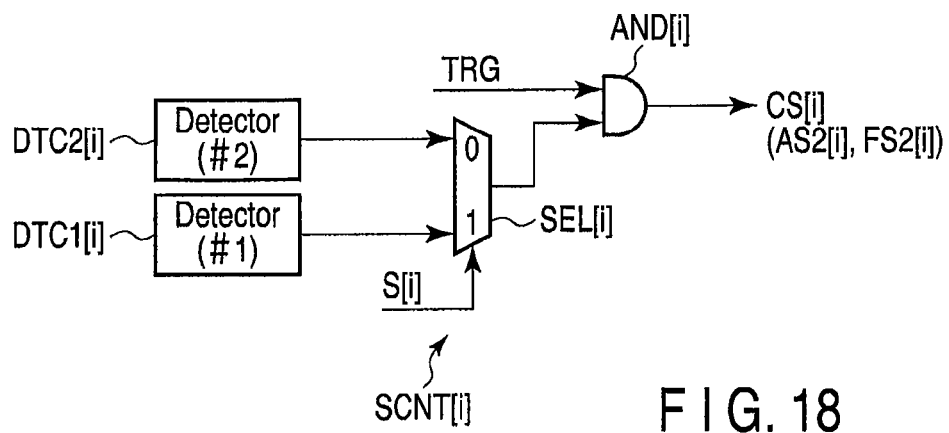
FIG. 18 is a block diagram showing an exemplary configuration of a selection controller according to the embodiment.

FIG. 18 is a block diagram showing the configuration of a selection controller SCNT[i] included in the substitution controller 15. The selection controller SCNT[i] detects that "i" meets the substitution condition, to output the condition match signal CS[i]. The condition match signal CS[i] is used as the selection signals AS2[$i$] and FS2[$i$] as described above. That is, the selection controller SCNT[i] detects that "i" meets the substation condition, to control the selector ASEL2 [$i$] in the address section ADR[i] of cfifo[i] and the selector FSEL2[$i$] in the flag section FLG[i] of cfifo[i].

The substitution condition is divided into a first condition and a second condition in accordance with the magnitude relationship between "wp" and "n". When wp≦n (first state), the first condition is used as the substitution condition. The first condition is that "i" is wp≦i≦n. When n≦wp (second state), the second condition is used as a condition for "i" at which cfifo[i] is subjected to substitution. The second condition is that "i" is i≦n or wp≦i.

The selection controller SCNT[i] comprises a detector (first detector) DTC1[i] (#1), a detector (second detector) DTC2[i] (#2), a selector (third selector) SEL[i], and an AND gate AND[i]. The detector DTC1[i] detects when "i" is such that wp≦i≦n, that is, when "i" meets the first condition. The detector DTC1[i] outputs a signal "1" if wp≦i≦n and otherwise a signal "0". The detector DTC2[i] detects when "i" is such that i≦n or wp≦i, that is, when "i" meets the second condition. The detector DTC2[i] outputs a signal "1" if i≦n or wp≦i and otherwise a signal "0".

The selector SEL [i] selects either the output signal from the detector DTC1[i] or the output signal from the detector DTC2[i] in accordance with a selection signal S[i]. The selection signal S[i] is "1" if wp≦n (first state) and is "0" if n≦wp (second state). The selector SEL[i] selects the output signal from the detector DTC1[i] if the selection signal S[i] is "1" (wp≦n). The selector SEL[i] selects the output signal from the detector DTC2[i] if the selection signal S[i] is "0" (n<wp).

While the substitution trigger signal TRG from the processing unit 2 is "1", the AND gate AND[i] outputs an output signal from the selector SEL[i] as the condition match signal CS[i] indicating whether or not "i" meets the substitution condition. The condition match signal CS[i] is used as the selection signal AS2[i] or FS2[i]. The substitute controller 15 comprises 128 selection controllers SCNT[i] (where N=128).

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A command management device comprising:
a command buffer configured to store commands received from a host:
a free address register configured to hold an address of an area in the command buffer in which an unnecessary command is stored, as a free address; and
a FIFO unit with entries, the entries comprising address sections configured to store addresses of the areas in the command buffer in which the respective commands are stored, the address sections being connected together like a ring, each of the address sections comprising a substitute module configured to substitute either the free address held in the free address register or a second address stored in the address section preceding the each of the address sections for a first address stored in the each of the address sections.

2. The command management device of claim 1, further comprising a write pointer pointing to an entry address "wp" of the address section of the FIFO unit in which the address of an area in the command buffer is stored in which area a command newly received from the host is to be stored,
wherein:
the substitute module in a first address section of the address sections is configured to substitute the second address stored in a second address section preceding the first address section for the first address stored in the first address section if an entry address "i" of the first address section is not equal to the "wp" in a first state and in a first case, the first state being a state in which the "wp" is less than or equal to an entry address "n" of an entry in the FIFO unit in which a third address equal to the free address is stored, the first case being a case where the "i" meets a first condition that the "i" is greater than or equal to the "wp" and less than or equal to the "n"; and
the substitute module in the first address section is configured to substitute the second address stored in the second address section for the first address stored in the first address section if the "i" is not equal to the "wp" in a second state and in a second case, the second state being a state in which the "wp" is greater than the "n", the second case being a case where the "i" meets a second condition that the "i" is less than or equal to the "n" or greater than or equal to the "wp".

3. The command management device of claim 2, wherein each of the address sections of the entries in the FIFO unit comprises a flip-flop used to store the corresponding address and operating at a predetermined clock signal.

4. The command management device of claim 3, wherein the substitute module in the first address section comprises:
a first selector configured to select either the free address held in the free address register or the second address stored in the flip-flop in the second address section in accordance with whether or not the "i" is equal to the "wp"; and
a second selector configured to select the address selected by the first selector in each of the first case and the second case and to select the first address stored in the flip-flop in the first address section in a case which is not the first case or the second case,
wherein the flip-flop in the first address section is configured to store the address selected by the second selector in accordance with the clock signal.

5. The command management device of claim 4, further comprising a substitute controller configured to control the substitute module contained in each of the entries in the FIFO unit, the substitute controller comprising a selection controller corresponding to each of the entries in the FIFO unit, the selection controller being configured to control the second selector such that the second selector selects the address selected by the first selector, by detecting each of the first case and the second case, if the entry address of the entry corresponding to the selection controller is the "i".

6. The command management device of claim 5, wherein the selection controller comprises:
a first detector configured to detect that the "i" meets the first condition and then to output a first detection signal;
a second detector configured to detect that the "i" meets the second condition and then to output a second detection signal; and
a third selector configured to select the first detection signal in the first state and to select the second detection signal in the second state,
wherein the second selector is configured to select the address selected by the first selector or the first address in accordance with the signal selected by the third selector.

7. The command management device of claim 2, further comprising a read pointer pointing to an entry address "rp" of an address section in the FIFO unit in which the address of an area in the command buffer is stored in which area a next command to be unloaded is stored, in order to allow the commands stored in the command buffer to be unloaded in order of storage, the read pointer being updated so as to point to an entry succeeding the entry with the entry address "rp" pointed to by the read pointer if the entry address "rp" pointed to by the read pointer is greater than or equal to the "wp" and less than or equal to the "n" in the first state, or is less than or equal to the "n" or greater than or equal to the "wp" in the second state, during substitution by the substitute module.

8. The command management device of claim 2, further comprising a detector configured to detect the entry address "n" of an entry in the FIFO unit in which the third address equal to the free address is stored, by comparing the free address with the address stored in each of the address sections of the entries in the FIFO unit.

9. The command management device of claim 8, wherein the detector comprises:
   comparators corresponding to the entries in the FIFO unit, each of the comparators being configured to compare the free address with the address stored in the address section of the corresponding entry; and
   a converter configured to convert a combination of results of comparison from the respective comparators into the entry address "n" in accordance with a position, in the combination, of a comparison result indicating a match.

10. The command management device of claim 8, wherein the addresses of different areas in the command buffer are initially set in the address sections of the entries in the FIFO unit.

11. A storage apparatus comprising:
   a command management device configured to manage commands received from a host, the command management device comprising:
      a command buffer configured to store commands received from a host;
      a free address register configured to hold an address of an area in the command buffer in which an unnecessary command is stored, as a free address; and
      a FIFO unit with entries, the entries comprising address sections configured to store addresses of the areas in the command buffer in which the respective commands are stored, the address sections being connected together like a ring, each of the address sections comprising a substitute module configured to substitute either the free address held in the free address register or a second address stored in the address section preceding the each of the address sections for a first address stored in the each of the address sections;
   a storage unit; and
   a processing unit configured to access the storage unit, the processing unit being configured to sequentially read the addresses stored in the respective address sections of the entries in the FIFO unit and to unload the commands from the areas in the command buffer specified by the read addresses and to access the storage unit in accordance with the unloaded commands.

* * * * *